P. GEISER.
Thrashing Machine.
No. 2,484. Reissued Feb. 19, 1867.
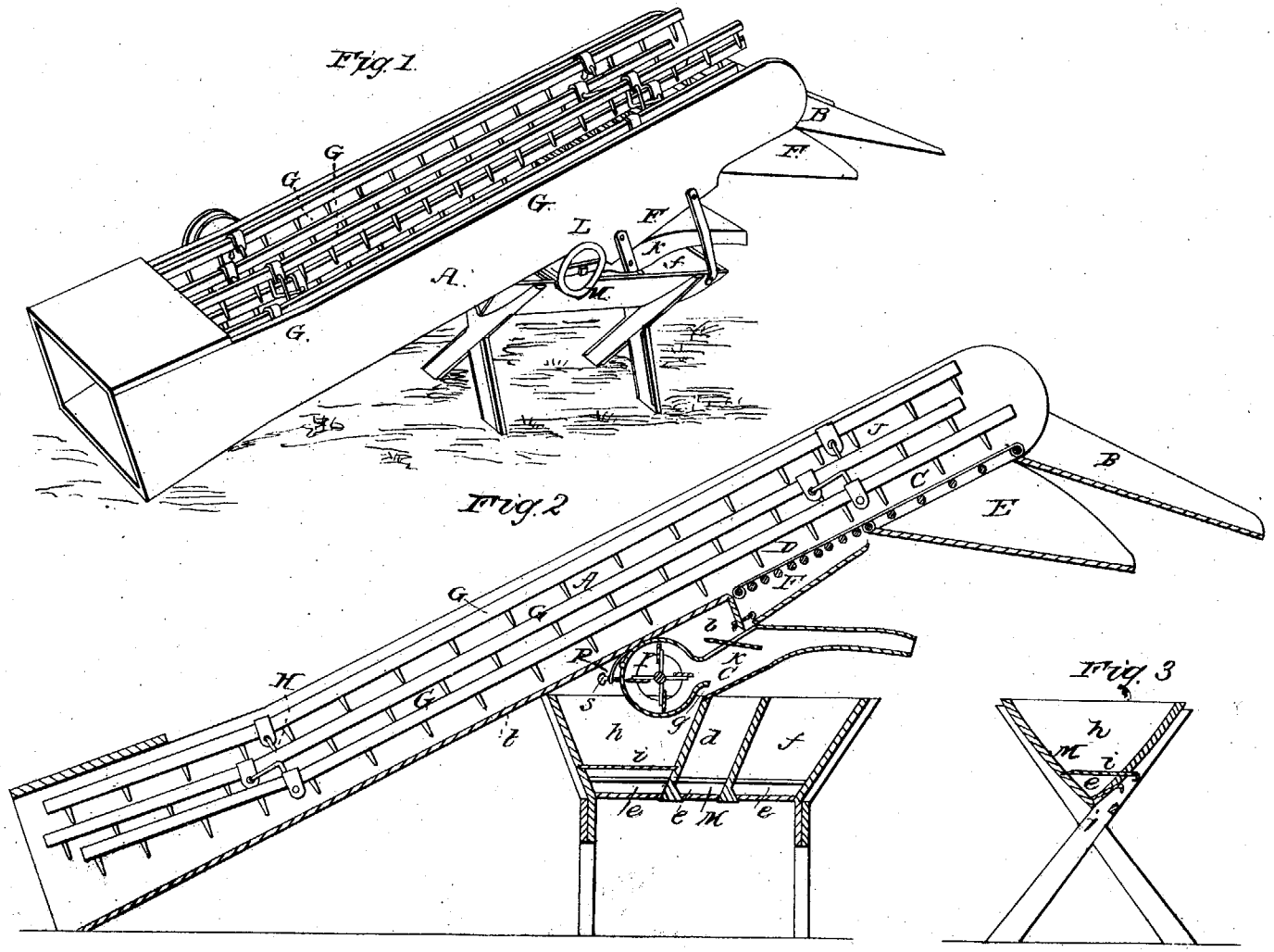
N. PETERS, Photo-Lithographer, Washington, D. C.

United States Patent Office.

PETER GEISER, OF GREENCASTLE, PENNSYLVANIA.

*Letters Patent No.* 9,341, *dated October* 19, 1852; *extended seven years; reissue No.* 2,484, *dated February* 19, 1867.

IMPROVEMENT IN GRAIN SEPARATORS.

The Schedule referred to in these Letters Patent and making part of the same.

TO ALL WHOM IT MAY CONCERN:

Be it known that I, PETER GEISER, formerly of Smithsburg, in the county of Washington, and State of Maryland, now of Greencastle, in the county of Franklin, and State of Pennsylvania, have invented certain new and useful Improvements in Grain Separators and Cleaners, of which the following is a full, clear, and exact description, reference being had to the accompanying drawings, which form part of this specification, and in which—

Figure 1 represents a view in perspective of my improved grain separator and cleaner.

Figure 2 is a vertical longitudinal section of the same; and

Figure 3 is a transverse section of the receiving and measuring bin.

My improvements are divided into several parts, which may be used separately or in connection, and which may be applied to machines of the same class heretofore in use.

The first part of my invention consists of a series of reciprocating toothed bars, by whose action the mixed grain and straw delivered by a threshing machine are elevated and conveyed to a suitable height to be fed to a cleaning apparatus, and in their transit are thoroughly shaken up, the grain and chaff being thoroughly separated, by the action of the reciprocating bars, from the straw, the latter being ejected at the hinder end of the machine, while the grain, chaff, &c., are discharged through a grating into a cleaning apparatus beneath.

The second part of my invention has reference to the regulation of the blast of the cleaning or winnowing apparatus, and consists in forming a part of the fan case into a door, which opens and permits the blast to escape whenever the pressure exceeds that which is suitable for winnowing the grain.

The third part of my invention consists of a measuring receiving bin, by means of which the grain cleaned by the machine is readily and conveniently measured into bags without the necessity of a second handling.

The elevating trough A of the machine represented in the accompanying drawing rests at one extremity upon the ground or floor of the barn, its opposite extremity being raised therefrom sufficiently, by the framework of the cleaning apparatus on which it is supported, or by cords or chains suspended from the frame of the barn, to give ample room for the cleaning apparatus between it and the floor. The upper extremity of this elevating trough is fitted with a straw-spout, B, through which the straw is discharged and conveyed to the stack, or to the place whence it is by suitable means carried off. The floor of the trough nearer this straw-spout or conveyor is formed by a coarse grating, C, the meshes of which are sufficiently large to allow the heads of grain to pass, but are too fine to permit the passage of straw. Another portion of the floor of the trough, immediately preceding this coarse grating, is formed by a second grating, D, whose meshes are sufficiently fine to allow the grain, chaff, &c., to pass through, but are too fine to permit the passage of heads. The mass conveyed up the elevating trough will therefore be divided into three principal parts, of which the smallest, consisting of the grain, chaff, cheat, &c., will pass through the lower or fine grating D; the heads and short pieces of straw will pass through the outer or coarse grating C; and the mass of straw will be delivered to the straw-spout B, to be disposed of as may be convenient. The coarse grating has a spout, E, fitted beneath it, to deliver the mass separated by it, and the fine grating has also a spout, F, fitted beneath it, to deliver the matters separated by it to the cleaning apparatus beneath. The gratings C and D are formed by transverse bars, over which cords or wires are strained in a longitudinal direction; this form of grating possessing, it is believed, the requisites of efficiency, durability, and the facility of repair in a greater degree than any previously in use in this class of machines. The mass of mixed grain and straw, as it comes from the threshing machine, is conveyed up the trough by a series of toothed reciprocating bars, G G G, these bars extending nearly the whole length of the elevating trough, and each is fitted with a series of rake teeth. The lower extremity of the bars is connected with a transverse shaft, H, which is bent into a series of cranks equal in number with that of the bars. These cranks are formed at different angles upon the shafts, so that when the shaft is caused to revolve the bars are caused to move forward, to rise, move backward, and sink to their first positions in alternate succession. The upper extremities of the toothed bars are supported by a similar crank-shaft, J, whose cranks mate with those of the lower crank-shaft, so that both extremities of the bars are caused to move simultaneously, equally, and in the same direction. As the cranks stand at different angles, some of the bars will be continually moving forward and ascending, thus shoving the grain up the trough, while others will be retrograding and descending to take a fresh grasp upon the straw. In this movement the straw will not only be shoved upward, but as the teeth rise portions of the straw will be slightly and suddenly raised, and this shaking up will facilitate the settling of the grain and chaff to the bottom of the trough, up which it will be shoved by the ascending straw moving thereon until it arrives at the grating, through which it drops into the spout F. The spout F shoots the matters falling upon it into the winnowing apparatus. This spout is fitted at its lower extremity with a flap-door, *a*, which can be closed by a cord to prevent the passage of grain, &c., into the winnowing apparatus whenever the speed of the machine is checked too much to insure a thorough cleansing of the grain. From the spout F the grain, &c., falls first upon a coarse screen, *b*, which is situated in a wind-chest, K, through which a constant current of air is maintained by means of a fan, L. This blast carries off the lighter particles and discharges them through the open hinder end of the wind-chest, while the grain and heavier particles fall through the screen and the blast, upon an inclined, finer screen, *c*, down which they slide towards the fan. In their passage over this screen, the particles which are smaller than grain, such as chess, for example, pass through. The heavier of these are received into a bin, *d*, situated directly beneath the screen, while the lighter, being deflected from a vertical direction by the blast, are deposited in a second bin, *f*, situated nearer the hinder end of the machine. The grain, being too large to pass through the meshes of the machine, is shot by it through an opening, *g*, at its foot, into a bin, *h*, situated beneath the fan case. The three receiving bins, *d*, *f*, and *h*, form three compartments of a receiver, M, whose sides converge, as shown in section at fig. 3. Each of these compartments or bins is fitted with a sliding door, *e*, by raising which the matters in the bin are permitted to escape into a bag, which is supported beneath the door by a cross-bar, *j*, fitted with suitable hooks or pins to hold the bag erect and open-mouthed. The grain bin *h* is not only fitted with a suitable discharging door, but is also divided horizontally by a slide, I. This slide is situated at such a distance from the bottom of the bin that the space beneath it will contain just half a bushel or other known measure, so that the attendant, by shoving this slide, may separate half a bushel or other known quantity of the grain from the rest in the bin. He may then open the lower door to discharge this measured quantity into the bag. When it has all run out the lower door is closed, and the slide is withdrawn to permit the grain to descend into the lower portion of the bin, whence a second measure is in like manner drawn off and delivered into the bag. This apparatus, therefore, enables the farmer to measure his grain directly into bags, without the necessity of a second handling, and the labor and loss of time incident thereto. In order to prevent the blast from ever becoming sufficiently strong to blow the grain out of the machine along with the chaff, a portion, *n*, of the fan case is formed into a flap-door, which, when the blast becomes too strong, by the too rapid revolution of the fan, opens and permits a portion to escape. In general this door may be made sufficiently heavy to act properly; but I prefer to make the door rather light, and to hold it shut by the spring *r*, whose tension, as shown in the drawing, may be varied by means of an adjusting screw, *s*, to regulate the blast according to the quality of the grain: thus, if light grain is cleaned, the screw is slacked, while for heavy grain the screw is tightened to render the spring more rigid.

The machine thus constructed may be used in connection with a threshing machine, by adapting the lower extremity of the elevating trough to the delivery spout of the thresher. When used separately, one of the crank-shafts is caused to revolve by the prime mover, and a rotary motion is imparted from it to the fan, by means of cords or belts, encircling suitable pulleys secured to the two; or the fan may be driven by the prime mover, and the crank-shaft may be driven by the fan; or both may be driven independently. In case the machine is connected with a thresher, its shafts may be put in motion from the threshing cylinder by means of suitable belts and pulleys. In order to remove any grain that may remain in the elevating trough when the machine is stopped after the work is done, I intend to form a door in its bottom, at the point shown by the lines *t t*, through which this grain may be swept into a basket or other receptacle placed beneath. The measuring bin may be made of any convenient form and dimensions; but the space beneath the slide should be of such space that the grain will run out when the door is opened. Its capacity should also be equal to that of some well-known standard of measure, as the bushel or half bushel. The crank-shafts which drive the toothed bars may be made in the form of helices or worms, the bars being connected with the different portions of the worms, so as to descend and rise at different moments. The bars may also, if preferred, be hung from the cranks instead of being supported by them. In arranging the cranks for carrying the reciprocating toothed bars they should be so disposed that the weight of the bars shall be counterbalanced.

What I claim as my invention, and seek to secure by Letters Patent, is—

1. A series of toothed bars G, attached directly to a crank-shaft, having cranks at varying angles, said bars having reciprocating motion in parallel vertical planes, and coming alternately or successively into action on the straw, substantially as and for the purpose set forth.

2. I also claim, in combination with the reciprocating toothed bars G, the trough A, when the bottom of the latter is subdivided into tight and open portions, substantially as and for the purpose set forth.

3. So arranging the reciprocating toothed bars G on a crank-shaft having cranks of varying angles that the whole shall be counterbalanced, substantially as set forth.

In testimony whereof I have signed my name to this specification before two subscribing witnesses.

PETER GEISER.

Witnesses:

R. MASON,

D. P. HOLLOWAY.